Dec. 28, 1937.  C. W. SIMPSON  2,103,342
ELECTRIC CHUCKING MACHINE
Filed Sept. 16, 1936  12 Sheets-Sheet 5

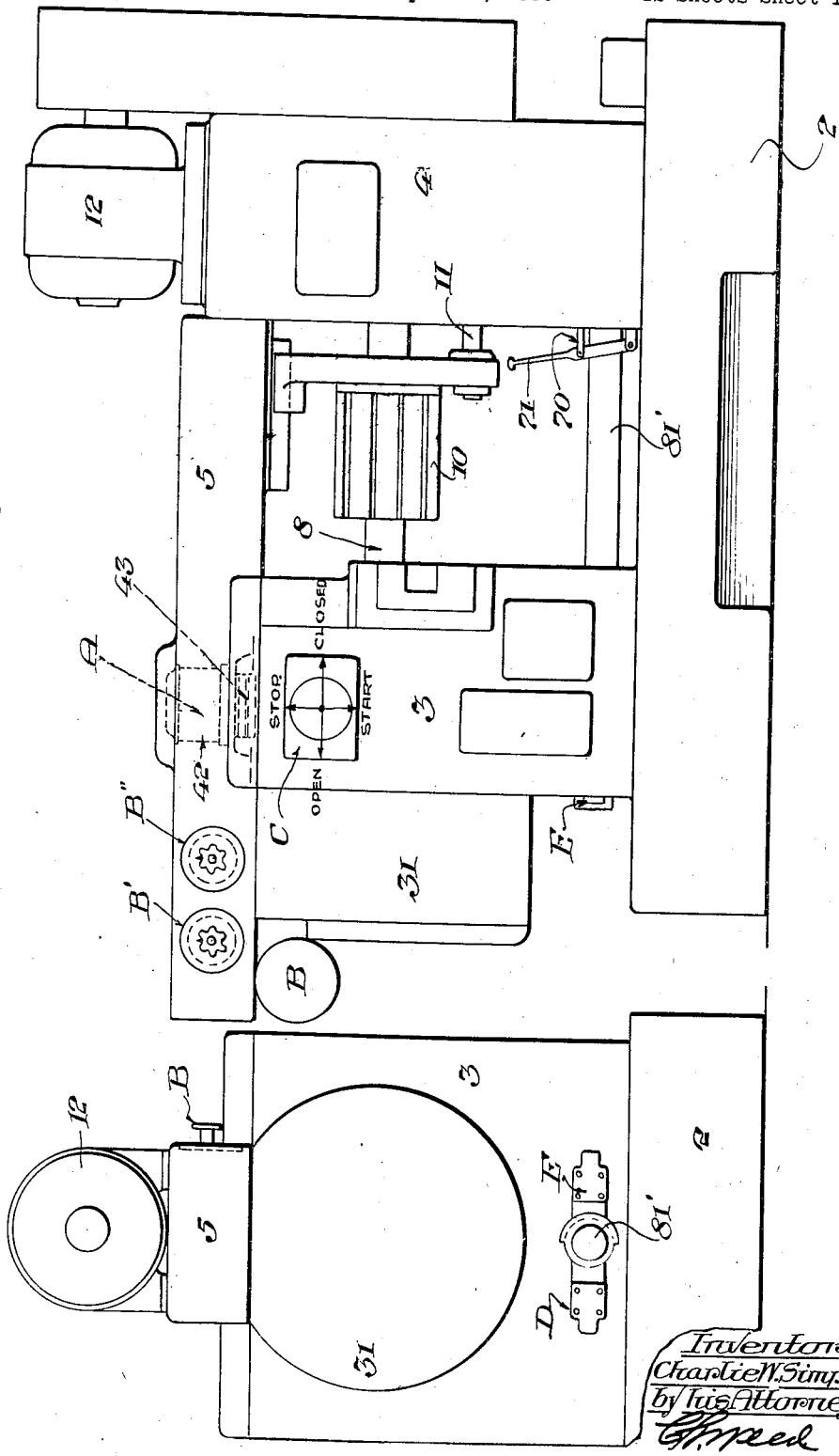

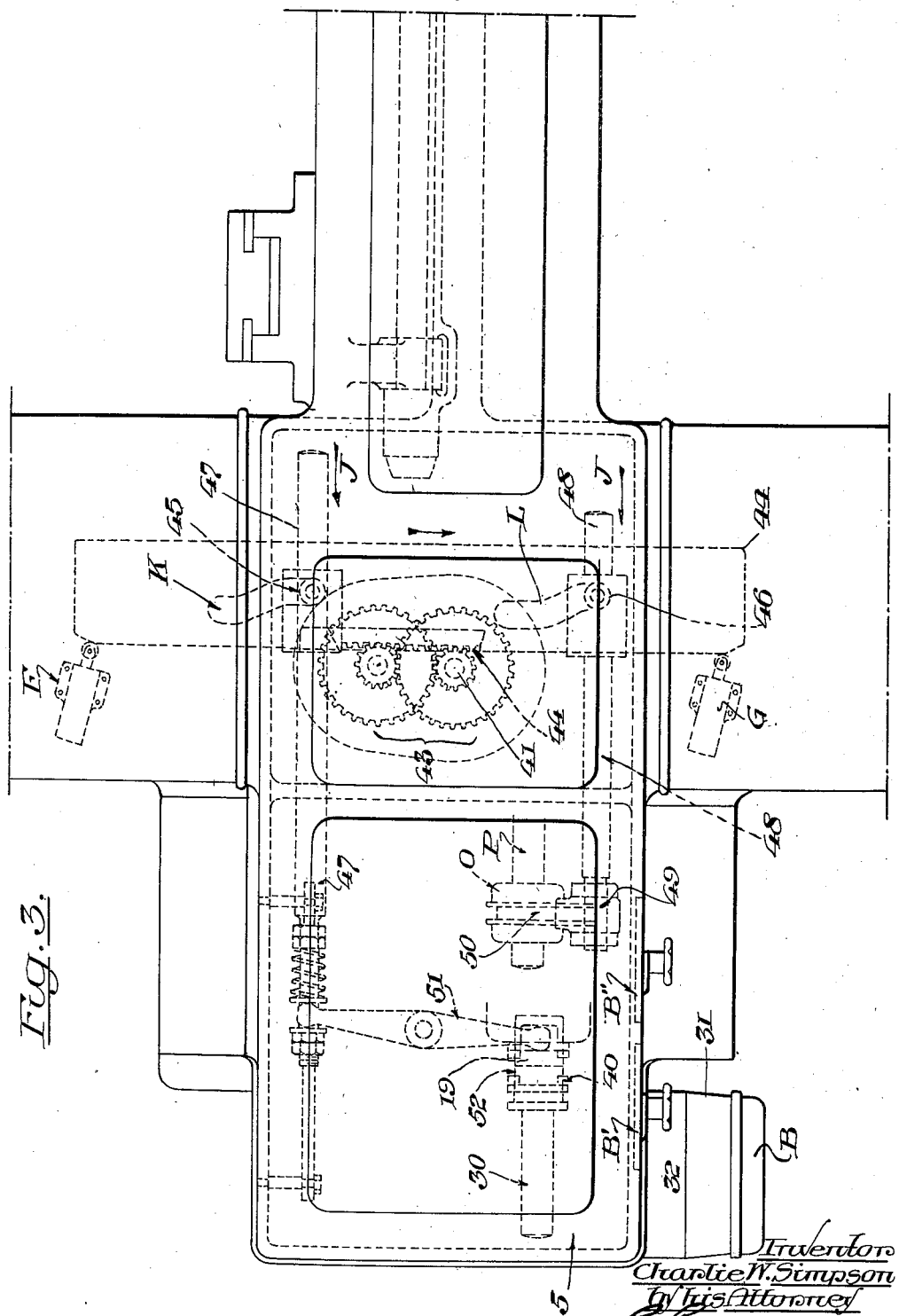

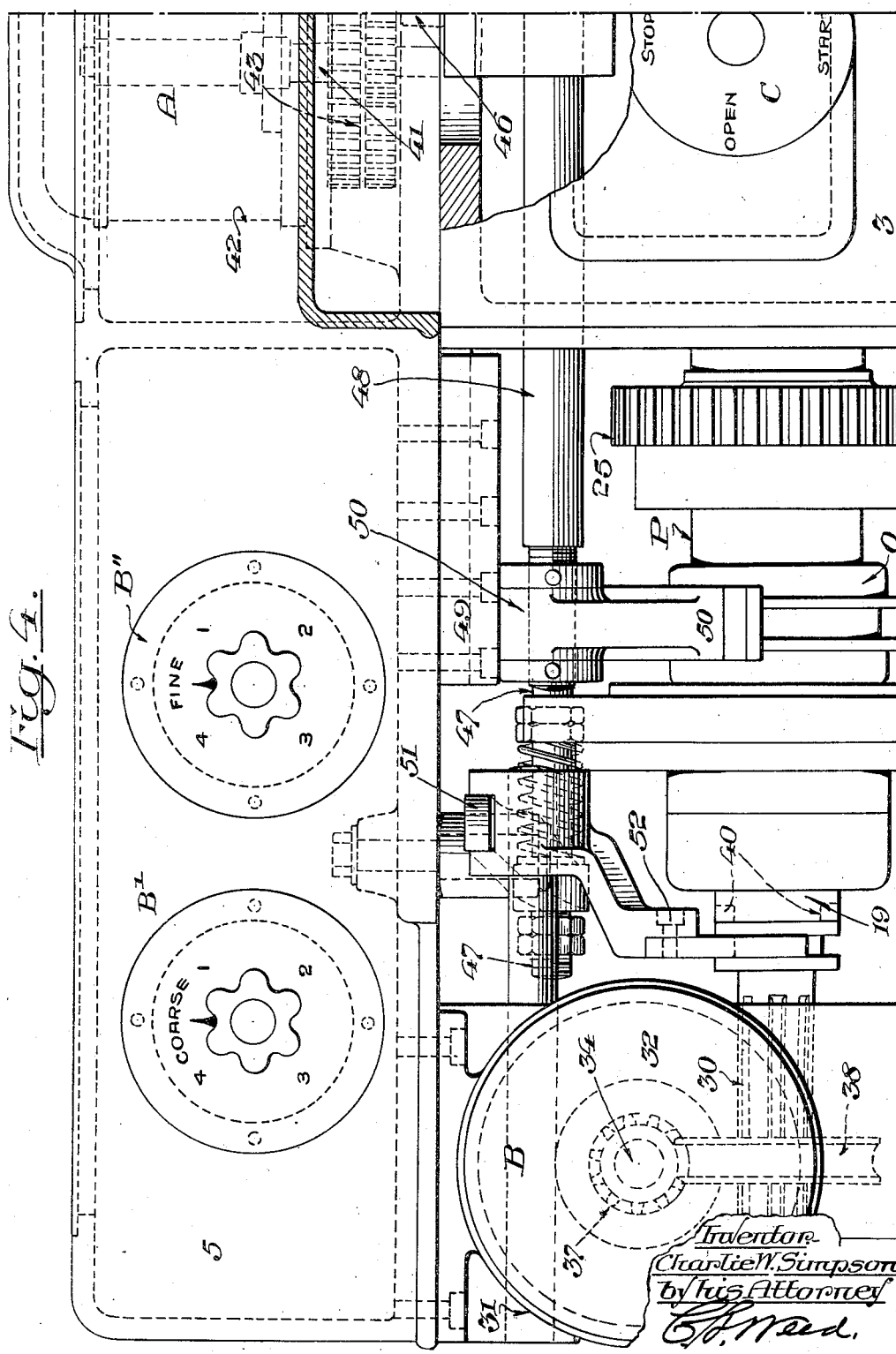

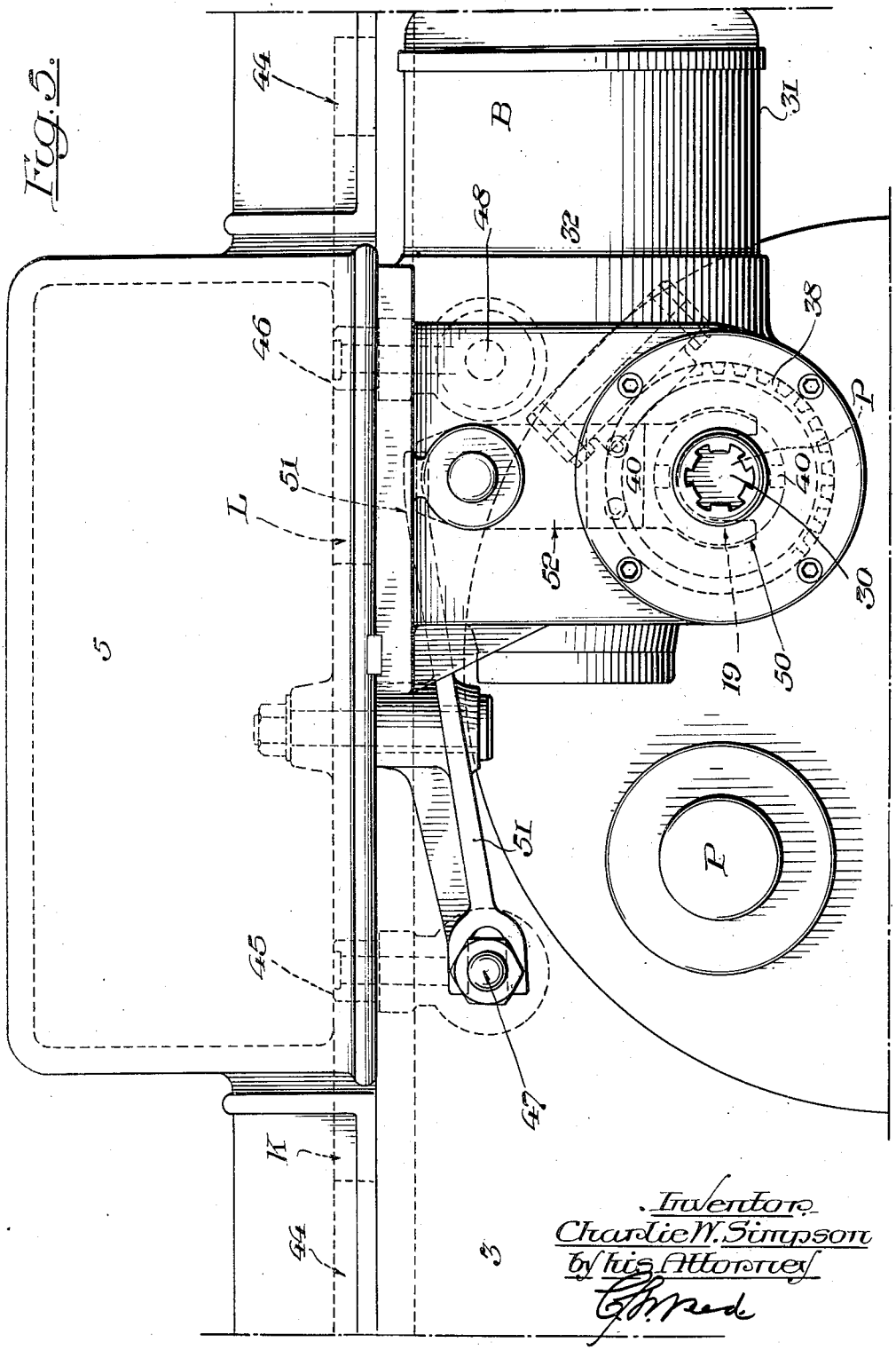

Inventor
Charlie W. Simpson
by his Attorney

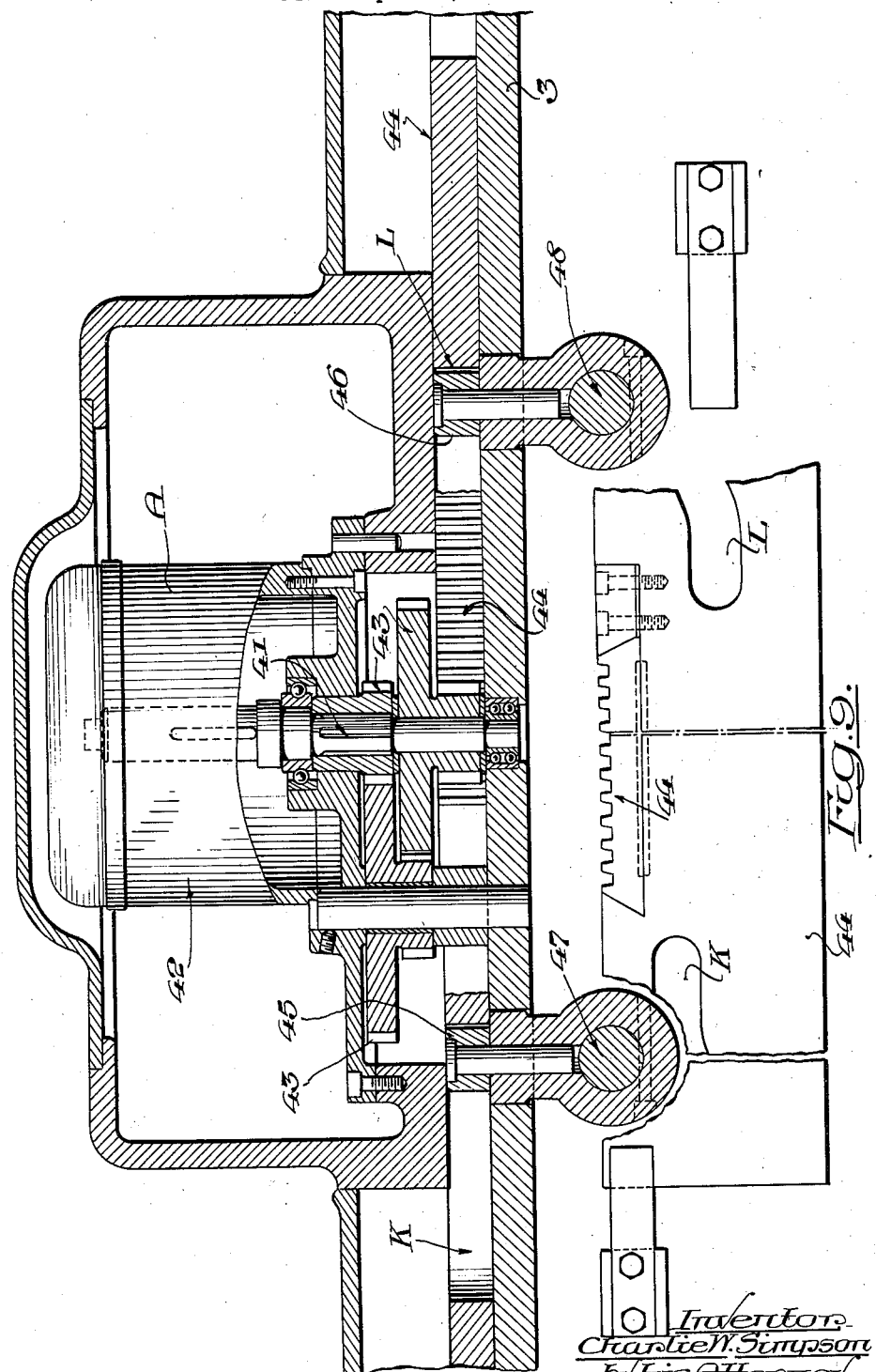

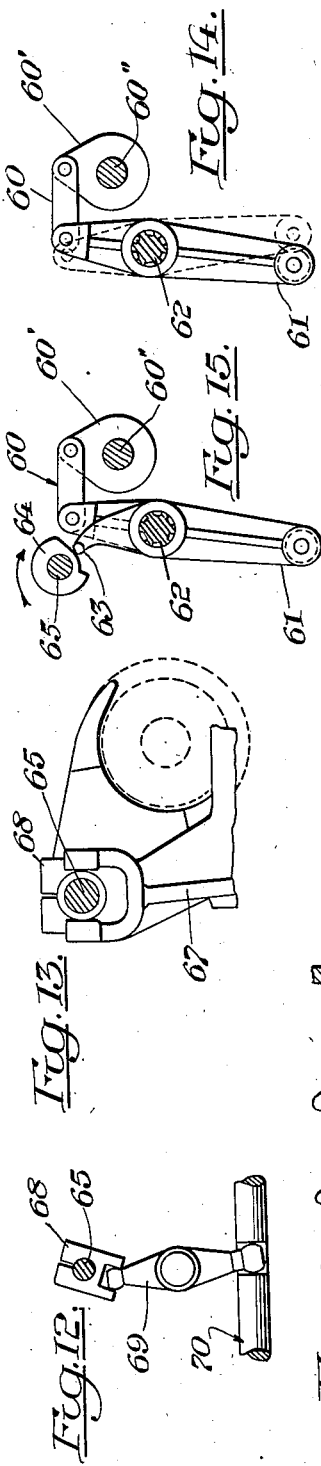
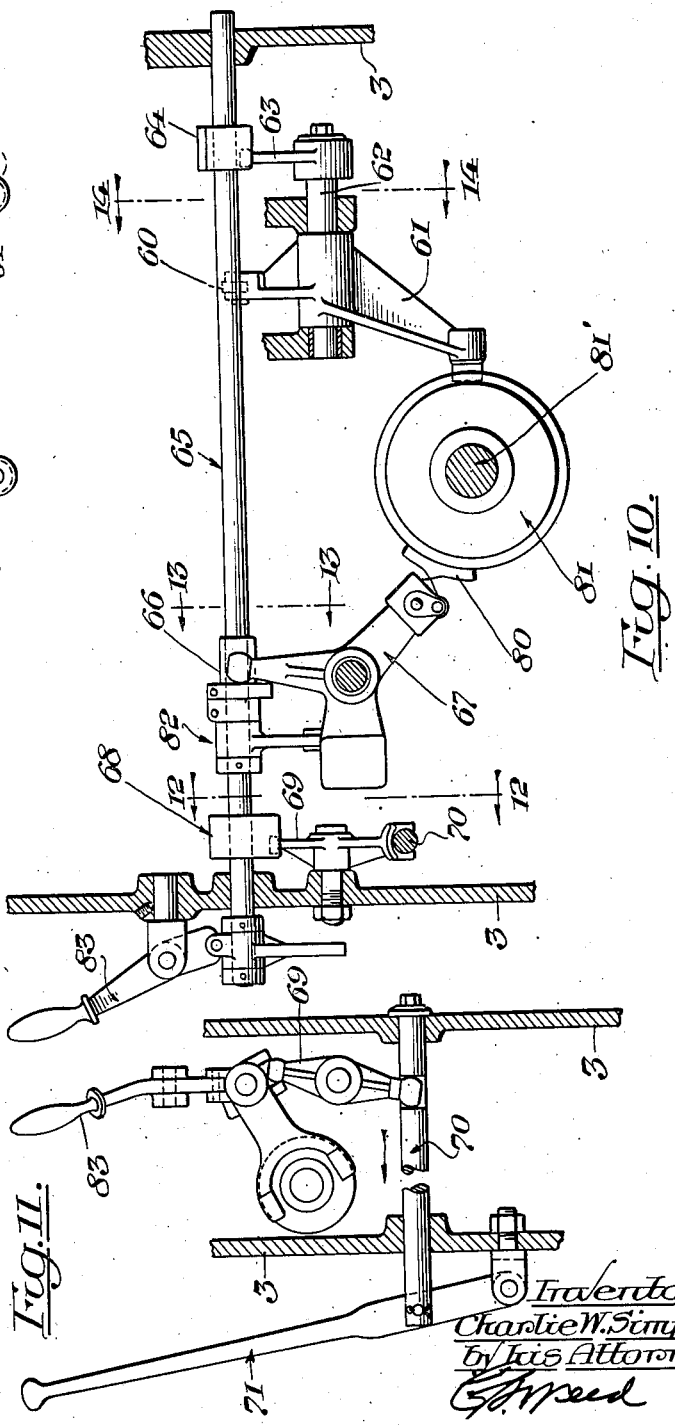

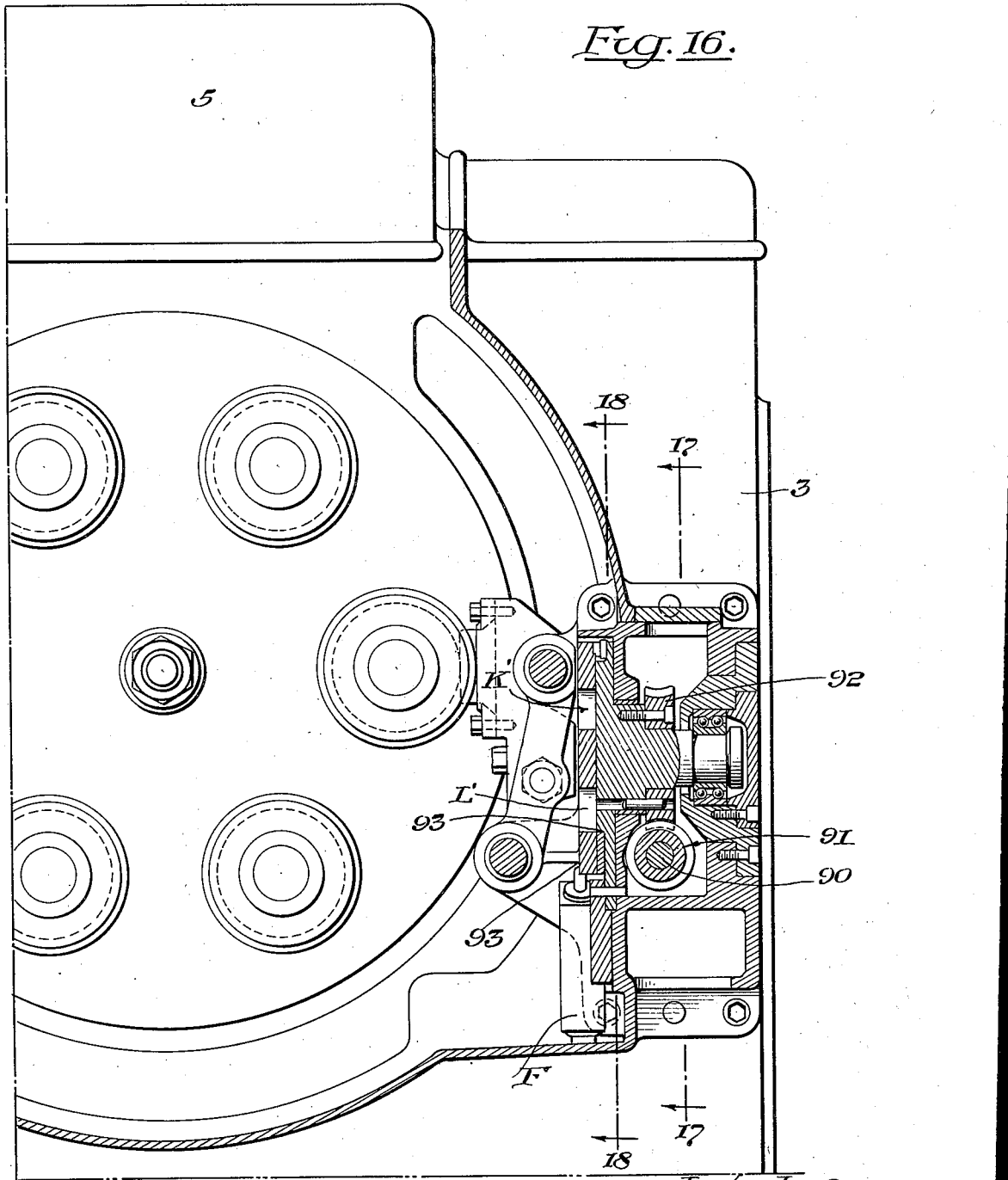

Dec. 28, 1937.  C. W. SIMPSON  2,103,342
ELECTRIC CHUCKING MACHINE
Filed Sept. 16, 1936  12 Sheets-Sheet 9
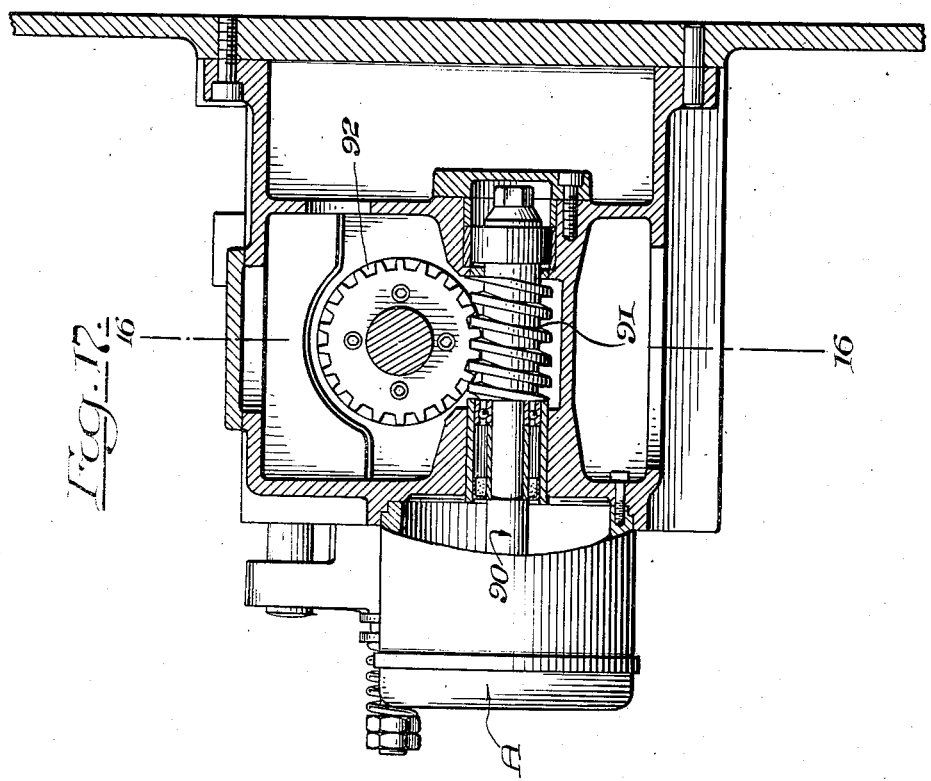
Inventor,
Charlie W. Simpson
by his Attorney

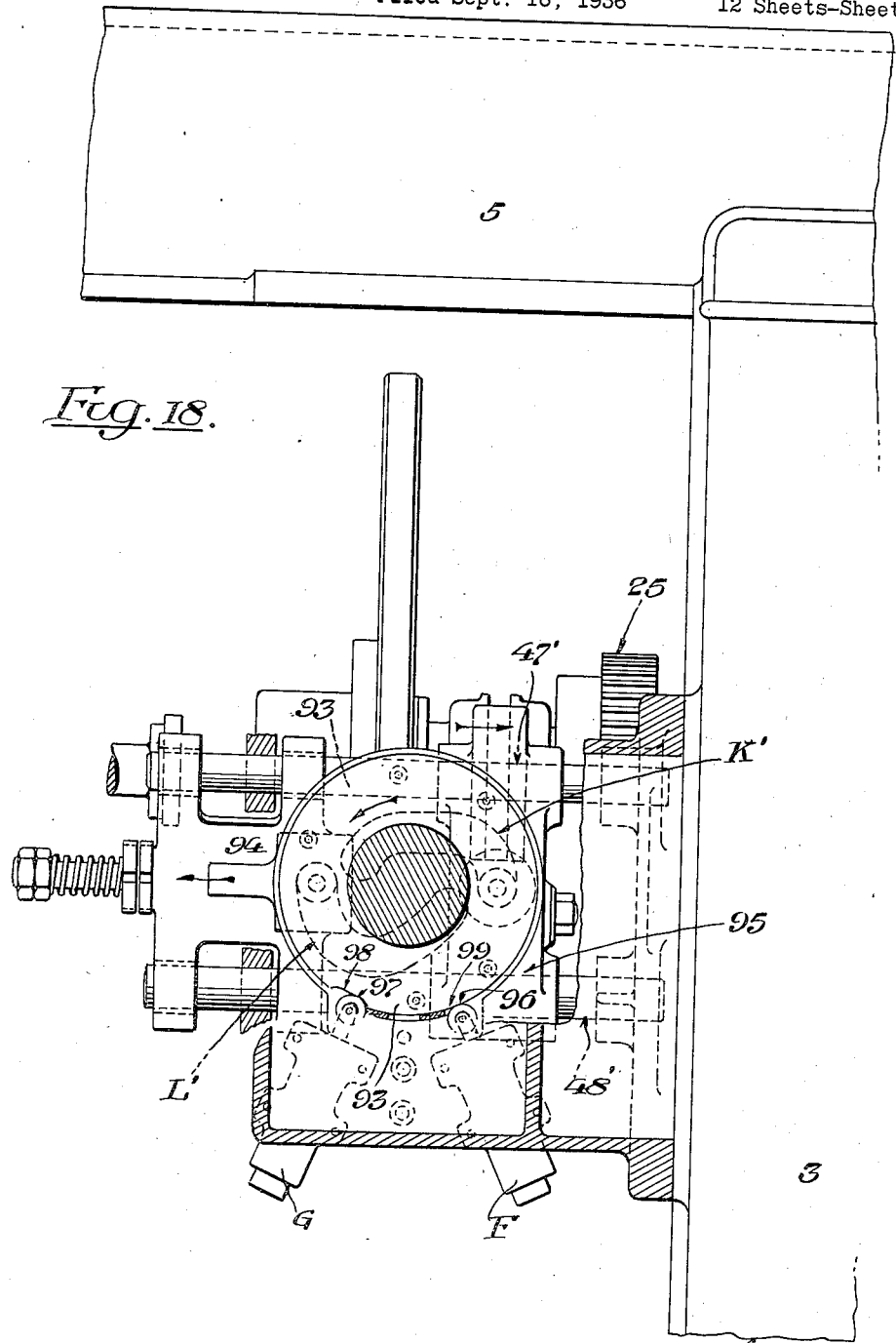

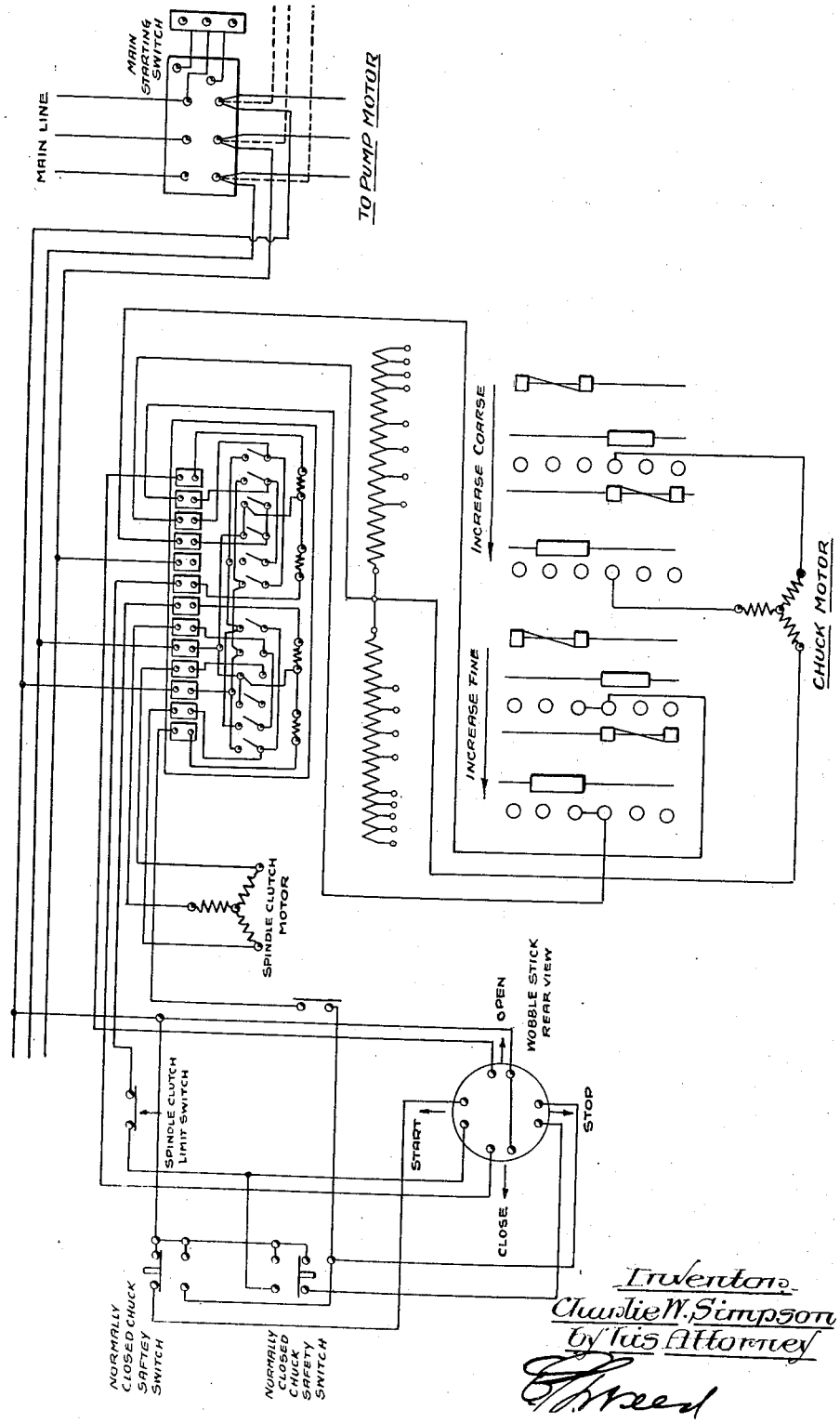

Patented Dec. 28, 1937

2,103,342

UNITED STATES PATENT OFFICE 2,103,342

ELECTRIC CHUCKING MACHINE

Charlie W. Simpson, Cleveland, Ohio, assignor to The National Acme Company, Cleveland, Ohio, a corporation of Ohio Application September 16, 1936, Serial No. 101,051

62 Claims. (Cl. 29—38)

This invention relates to automatic multiple spindle machines of the horizontal type, commonly termed automatic chucking machines, and which have a sliding tool carrier and an indexible work spindle carrier provided with a plurality of rotatable work spindles having chuck operating units and chucks for the reception of rough forgings or castings to be operated upon by the tools carried by the tool slide, the object of the invention being to provide an improved electrically operated mechanism for opening and closing the chucks carried by the rotatable work spindles, it being an improvement upon the allowed application of C. W. Simpson, Serial Number 50,538, filed November 19th, 1935, and assigned, as is this application, to The National Acme Company, of Cleveland, Ohio.

In that prior electrically operated machine, a single motor was used for rotating a shaft in axial alignment with the chucking unit carried by the rotatable spindle at each indexing of the spindle carrier and automatic means were employed to shift this shaft into position to co-operate with the chucking unit, this means, in that machine, being operated from the cam shaft of the machine.

In the present improvement, a single motor is also used to rotate this axially aligned shaft but, instead of shifting the shaft from the cam shaft, it is shifted by means of another electrically operated motor. This improved organization permits certain important improvements and advantages in the operation of the mechanism including the control of the rotating chuck carrying spindle.

Therefore, the primary object of the present improvement is the provision of an automatic multiple spindle machine having an indexible work spindle carrier provided with rotatable chuck carrying spindles having therein suitable chuck operating means or units, each rotated in sequence by an electrically operated means or motor to operate the chucks when the chucks and their spindles are successively indexed into position, in combination with an electrically operated means or motor for shifting said rotatable means into and out of engagement with the chuck operating unit and which is simple in construction and operation and effective to do the work desired in a highly efficient and rapid manner and which can be embodied in a comparatively small and practical machine, thus reducing the cost of manufacture and operation and having an axially supported sliding tool carrier carrying tools adapted to work on the forgings or castings carried by the chucks.

A further object of the invention is the provision of an improved, wholly electrically operated chucking mechanism utilizing a single electric motor fixed on the machine frame for rotating the chuck unit within a spindle and a single electric motor for shifting said rotating means into and out of operative position to co-operate with the chucking unit carried by each of the rotatable spindles as they are successively indexed into position and which embodies certain electrical features for automatically controlling the operation of the various parts.

In the drawings accompanying and forming a part of this specification, Fig. 1 is a side view of so much of the machine as it is deemed necessary to illustrate and having the present improvement applied thereto.

Fig. 3 is a top plan view of the left hand end of Fig. 1.

Fig. 4 is an enlarged side view partly in section of Fig. 3.

Fig. 5 is an end view of the left hand end of Fig. 3.

Fig. 7 is a sectional view taken at right angles to Fig. 6, as on the line 7—7 of Fig. 6.

Fig. 8 is a detail view partly in section of the motor mechanism designated herein as A.

Fig. 9 is a detail view of the rack.

Fig. 10 is a detail view of the brake control mechanism.

Fig. 11 is a left hand end view thereof.

Figs. 12, 13 and 14 are detail views taken respectively on lines 12—12, 13—13 and 14—14 of Fig. 10.

Fig. 15 is a detail end view of the right hand end of Fig. 10.

Figs. 16, 17 and 18 illustrate a modified form of motor mechanism A for shifting the parallel shafts, Fig. 16 being a vertical section on line 16—16 of Fig. 17; Fig. 17 a vertical section on line 17—17 of Fig. 16 and Fig. 18 a similar section on line 18—18 of Fig. 16.

Figure 19:
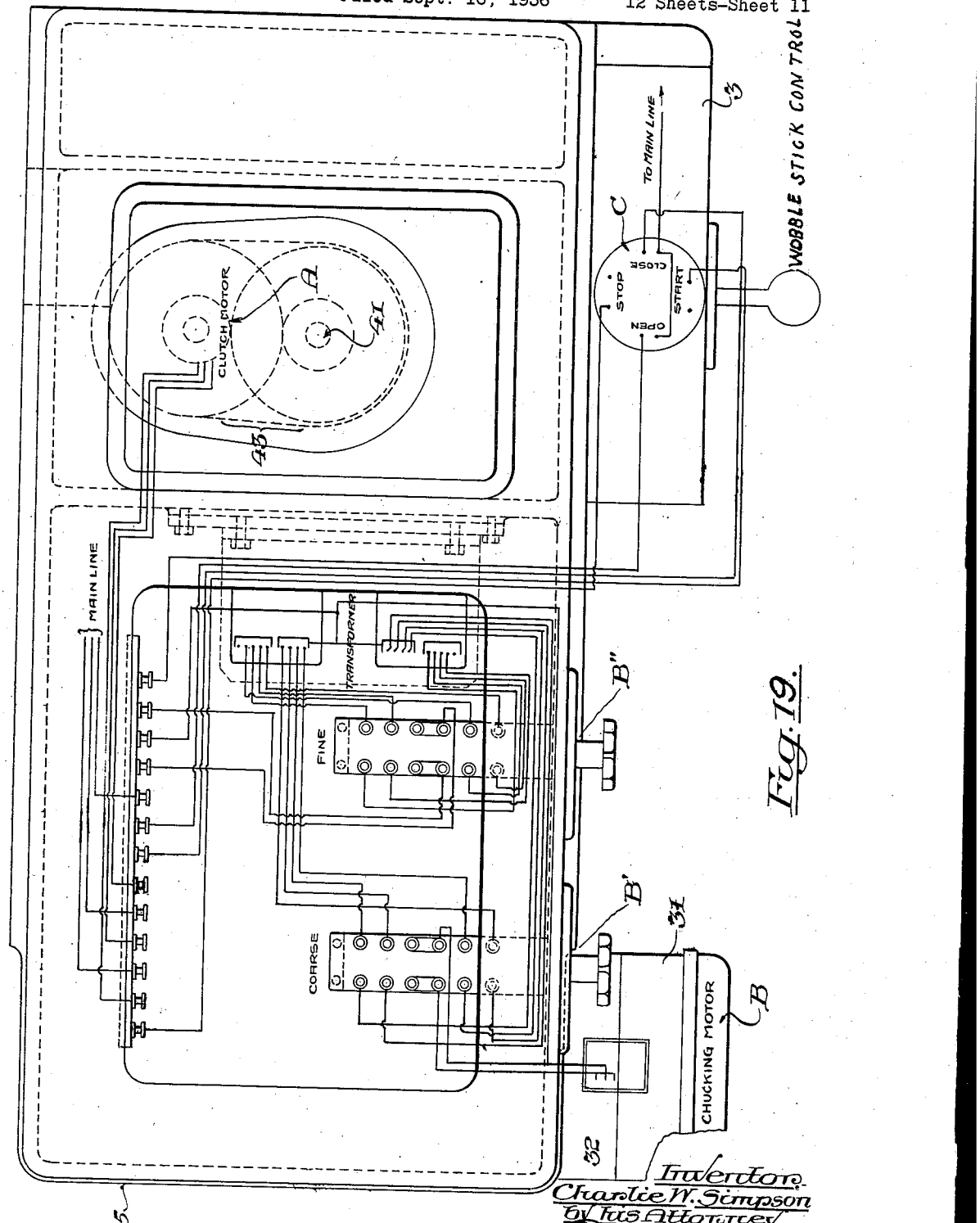

Fig. 19 is a diagrammatic electrical lay-out of the wiring from the main line to the switch C and the motors A and B for controlling the operation of the motors for shifting and rotating the shaft 30, and Fig. 20 is a somewhat similar view illustrating the manner in which an electrician would assemble the parts and wiring.

Similar characters of reference indicate corresponding parts in the several views.

Before explaining in detail the present improvement and mode of operation thereof, I desire to have it understood that the invention is not limited to the details of construction and arrangement of parts illustrated in the accompanying drawings since the invention is capable of other embodiments, and that the phraseology employed is for the purpose of description and not of limitation.

In the preferred form thereof, the present improvement is embodied in a multiple spindle machine of which a general description only is deemed sufficient and this comprises a bed or pan 2 (see Fig. 1), upright housing 3 at one end and an upright housing 4 at the opposite end, these housings being connected by an overhead beam 5.

The housing 3 supports the indexible chuck spindle carrier having rotatable work spindles carrying suitable chucks.

On an axially located tube 8 carrying a driving shaft for rotating the chuck spindles within the indexible carrier is an axially supported reciprocating tool slide 10 carrying the usual tool holders to operate upon the forgings or castings carried by the chuck, this slide being reciprocated by suitable means 11.

Within the housing 4 is the gear mechanism for the operation of certain parts of the machine.

The main driving means for the machine comprises a motor 12.

Located below the main tool slide 10 is a cam shaft and located in the indexible carrier are a plurality of rotatable chuck carrying spindles P, one of which is shown in Fig. 4. The construction and rotation of these chuck carrying spindles is shown in the contemporaneously pending application hereinbefore referred to and, therefore, a further description thereof is deemed unnecessary.

On the inside of the spindle is a chuck operating unit comprising a draw rod suitably connected at its forward end with the chuck jaws to open and close the same and as the construction and operation of this draw rod is also set forth fully and described in the contemporaneously pending application hereinbefore referred to, it is unnecessary to illustrate or describe the same further, it being sufficient to say that the draw rod is keyed or splined within the spindle to prevent its turning and is also provided with a thread and a guide collar and between the draw rod and work spindle is located a bronze nut or sleeve 19 which turns freely inside the spindle P, this nut turning freely to shift the draw bar when rotated by the axially sliding shaft 30, hereinafter referred to, connected with the electric motor B hereinafter described.

Obviously, by this simple mechanism, when the bronze nut 19 is rotated, the draw bar will be shifted back and forth within the rotatable chuck carrying spindle P to control the opening and closing of the chuck jaws.

For the purpose of rotating the chuck carrying spindles P supported by suitable bearings, each is provided with a gear 25 (see Fig. 4) in mesh with a gear carried by the main driving shaft located in the hollow tube axially supporting the main tool slide 10, which driving shaft, of course, is supported by suitable bearings at its front and rear ends, respectively.

The rotation of the bronze nut 19 and thereby the shifting of the draw bar to control the opening and closing of the chucks is effected by the rotating and sliding shaft 30 rotated by a single reversible motor, and for rotating this axially aligned shaft 30, a motor mechanism B is provided and for axially shifting it, a motor mechanism A is provided.

*Motor mechanism B*

The motor mechanism B is substantially similar to that shown and described in the contemporaneously pending application hereinbefore referred to and in a general way comprises a housing 31 for the electric mechanism B including its motor 32 and is bolted to the top beam 5 at the end of the machine (see Fig. 1) and the motor is controlled by suitable means or switches B' and B'' located conveniently near the chucking position and, of course, suitably electrically wired.

The motor shaft 34 of the motor 32 extends through the housing 31 and is supported by suitable ball bearings. Between these bearings, the motor shaft carries a worm 37 to drive a worm gear 38 and this worm gear is also suitably supported in the housing 31 by suitable ball bearings.

The worm gear 38 has a splined hole therein to receive and drive the splined shaft 30 which is located in alignment with the spindle P when the spindle carrier is indexed to bring each chuck into chucking position and is provided with lugs or projections 40 at one end for engagement with similarly formed parts or recesses in the end of the rotatable bronze nut 19 carried by each work spindle that shifts the draw bar backward and forward.

The engaging lugs 40 of this motor operated shaft 30 and the similarly formed openings or lugs of the rotating nut 19 are so constructed that there is sufficient play therebetween to give the motor a chance to start up before the lugs contact and this increases the torque of the motor or, to put it another way, the construction is such that the nut 19 will be jarred loose.

In operation, the operator places an unfinished part in the chuck with his right hand. With his left hand he moves the switch C (see Fig. 1), suitably wired, to closed position thereby starting the motor B which drives, through the worm mechanism, the shaft 30, thereby rotating it in the proper direction to clamp the part in the chuck.

The switches B' and B'' are selector switches which can be set as the case requires to cut down the voltage to the motor B, thereby changing the torque on the nut which shifts the draw rod in the spindle to close the chuck. By this means the clamping power of the chuck is regulated. These switches B' and B'' are each divided into four parts. The switch B' is the major switch and the switch B'' divides each of the divisions of switch B' into four finer parts thereby giving sixteen different voltages to control the motor B, thus regulating the pull on the draw bar to the chucks.

As illustrated in Fig. 4 and in the electrical diagram, Fig. 19, the switches B' and B'' are divided into coarse and fine control, that is, four stations on each and these are manually set to chuck the work at a predetermined pressure. In other words, each of the four stations on each switch controls a certain pressure through the transformer. For instance, if the piece to be operated upon is a solid forging, the full pressure or power of the motor of, say 440 volts, can be used because the piece cannot be distorted by this maximum pressure but if a shell is to be operated upon, the gripping power of the chuck must be lessened and this is accomplished by reducing the voltage. For instance, the switch B' will control voltages of 440, 330, 220 and 110 and then, by setting the switch B", this voltage may be still further divided into four intermediate stations.

*Motor mechanism A*

As the single aligned rotary shaft 30 must be shifted toward and from the draw bar in the rotary work spindle in order that its rotation will shift the draw bar therefor, for this purpose the motor mechanism A is provided.

This motor mechanism A comprises a motor 42 suitably housed (see Figs. 1 and 8) also controlled by the switch C and having its shaft 41 connected with a train of gears 43 to operate a rack 44, which rack is provided with a pair of cam slots K and L (see Fig. 3). These cam slots, by means of suitable rollers 45 and 46 and blocks shift a pair of parallelly located rods or bars 47 and 48. The bar 48 operates through a slide 49 and a shoe 50 to shift the clutch spool O carried by each rotary spindle when indexed into chucking position, thereby to clutch or unclutch the rotary work spindle and permit it to rotate or cease rotation. Thus, when the operator starts the motor 42, the rack will shift the bars 47 and 48 in one direction, as in the direction of the arrow J (Fig. 3) by means of the cam slots K and L and shift the clutch spool O in the same direction, starting the rotation of the work spindle P. At the same time, the cam slot K shifts the bar 47 which operates through a suitably connected lever 51 and clutch shifter 52 (see Figs. 3 and 4) to shift the axially aligned shaft 30 to disengage it from the bronze nut or sleeve 19 of the rotary work spindle P.

Figure 2:
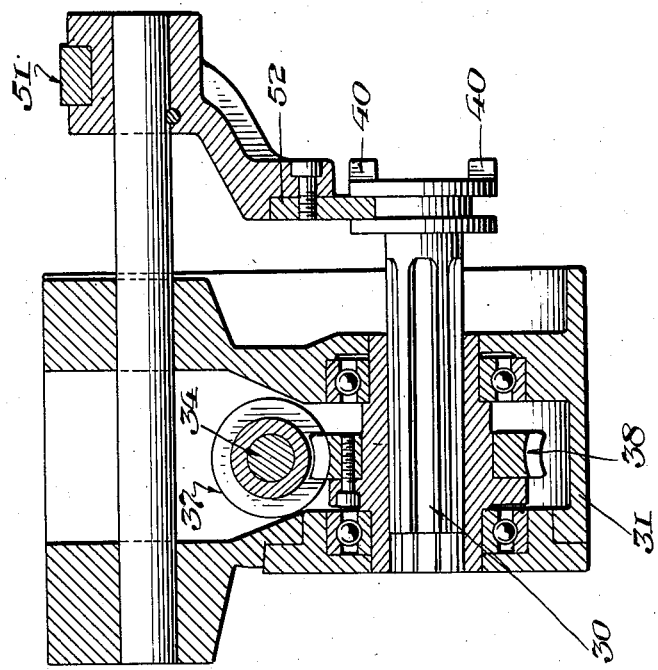
Fig. 2 is a left hand end view thereof.
Figure 6:
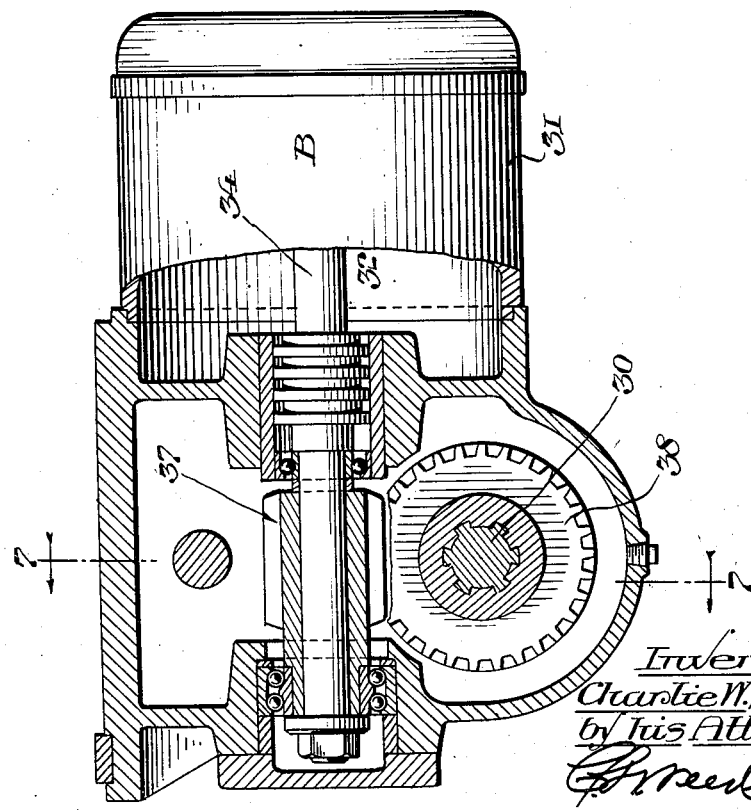
Fig. 6 is a detail sectional view of the motor mechanism designated herein as B.

In the event the operator does not pull the switch C to the starting point, a switch E (see Fig. 2) operated from the cam drum shaft 81' and wired with the starting switch will start the motor A for carrying out the operation just described.

To avoid the motor driving hard at the ends of the cam slots K and L, two switches F and G are provided, operated by the rack, to cut out the motor just before the ends of the slots K and L are reached and at this time, the operator should bring the safety lever 71 (see Figs. 1 and 11) into vertical position to permit the machine to complete its cycle and index.

A switch D (see Fig. 2) also operated from this cam drum shaft stops the rotary spindle P by starting the motor A in a direction reverse to that just described since, when the motor is reversed, the rack is shifted in an opposite direction and the bars 47 and 48 are likewise shifted in the opposite direction, thereby stopping the rotation of the work spindle P and shifting the axially aligned shaft 30 into position to shift the draw bar. This switch D is so wired as to operate with the stop position of the switch C, that is to say, either one of these switches can be used to stop the work spindle P, the switch D being automatically operated and the switch C manually operated.

The switches D and E, Fig. 1, co-operating with the cam shaft 81', operate automatically to control the motor A. In other words, by means of the cam shaft and these switches D and E, when the starting motor 12 is operated to start the machine, the motor A automatically operates at the proper time to stop and start the rotary spindle as it comes into chucking position and to brake and unbrake it and then shift or slide the shaft 30 to enable it to open or close the chuck. In short, one switch controls the motor A in one direction and the other switch reverses it, thereby to shift the shaft 30 toward or from the draw bar mechanism.

This operation, however, takes place when the spindle carrier has been indexed and locked and not during the indexing of the spindle carrier. However, the operator can also control the operation of this motor A by hand through the medium of the switch C, Fig. 1, for, by manipulating the switch C into stop and start positions, the motor A will accomplish precisely the same operations as performed by the cam shaft 81' and switches D and E, thus enabling the operator to chuck and unchuck the work should occasion require but this hand operation of the motor A, like the automatic operation thereof is only possible when the work spindle carrier has been indexed and locked. This same switch C also controls the operation of the motor B which rotates the shaft 30 for, by manipulating it into open or closed position, the motor B will be operated to rotate the shaft 30 in one or the other direction.

Thus, the motor A which slides the shaft 30 into and out of engagement with the draw bar unit is automatically controlled by the switches D and E in engagement with the rotating cam shaft 81' of the machine whereby the cycle of the machine is in time with the spindle clutch driving and stopping mechanism and is also manually controlled through the medium of the switch C which has four stations, two of which control the motor A to start and stop the work spindle and shift the shaft 30 in the event the work is chucked incorrectly or for any other reason, and two stations for controlling the motor B to rotate the shaft 30 to open and close the chuck.

*Brake mechanism*

When the work spindle is stopped, the machine automatically goes into low speed and at this time a brake mechanism goes into action (see Figs. 10 to 15) during which the link 60 is shifted in the direction of the arrow (Fig. 15). This link is connected with a lever 61 mounted on a short shaft 62 and connected with this short shaft is an arm 63 which comes into contact with a cam 64, revolving this cam 40 degrees in the direction of the arrow, thereby rotating the shaft 65 to which the cam is fixed.

The brake mechanism 60' (see Figs. 14 and 15) operated by the link 60 is on the rear end of the large worm shaft 60" which extends cross-wise of the machine and parallel with the shaft 65, being the usual worm shaft in automatic multiple spindle machines and, therefore, unnecessary to further illustrate herein, and is used to prevent the main cam shaft 81' from coasting when the machine goes from high to low.

Attached to this shaft 65 and rotating with it is a lugged member 66. The lug on this member rotates into position to engage a yoke 67 which is the feed clutch operating lever. Also connected to the shaft 65 and rotating with it is a part 68 which shifts a lever 69 pivoted on the frame-work and this lever shifts a rod 70 in the direction of the arrow to throw the lever 71 from its vertical position.

The operator now throws the switch C into open position which starts the motor B in a direction reverse to that previously stated, releasing the chuck from the work. However, if the operator has placed the work in the chuck and closed it and started the spindle and the work does not run true and he wishes to rechuck the work by stopping the work spindle, he may do so through the switch C by throwing this switch into stop position. The machine at this time is running and the three spindles outside of their loading position are doing their regular work. In the event this rechucking takes longer in time than the operation of the three working spindles and the machine is ready to go into high speed, then the cam 80 on the cam drum 81 on the main cam shaft 81' engages the yoke 67 throwing out, through the medium of the shaft 65 and yoke 82, the clutch on the feed shaft. This will stop the rotation of the drum shaft allowing the operator time to reset his piece and start the spindle by pulling the switch C into starting position and he must now start his machine by operating the lever 83.

However, if it is not necessary to rechuck the work and the machine has not progressed far enough in the operation to require stopping of the feed by the cam 80, he can push the lever 83 to the vertical position thereby sliding the shaft 65 back to its former position. This will shift the lug 82 on the shaft or rod 65 out of position in front of the yoke lever 67 so that when the cam 80 strikes the lever 67 it will not affect the position of the shaft 65 and the machine will complete its cycle.

*Modification of motor mechanism A*

In Figs. 16, 17 and 18, the motor mechanism A is placed on the side and rear of the machine operating through a shaft 90, worm 91 and worm wheel 92 directly connected to a disk cam 93. In this disk cam are two slots L' and K' corresponding to the slots L and K of the rack hereinbefore described. These slots, in turn, operate two sliding members 94 and 95 on the two bars 47' and 48', thereby operating the spindle clutch spools as each work spindle is rotated into position and shifting the driving axially aligned shaft 30 in the manner hereinbefore described.

The motor is wired the same and the switches F' and G' cut out the motor A at the end of the slots L' and K' in the manner previously described except the switch rolls 96 and 97 drop into slots 98 and 99 on the outside diameter of the disk cam 93 instead of co-operating with the rack in the machine first described.

It is, of course, understood that all of the chuck spindles are rotating during the cutting operations but during the chucking operations which are done in one position only, the rotating spindles are successively stopped automatically to allow the operator to remove the finished work and replace it by a rough casting. Therefore, when the spindle carrier indexes and brings the loading spindle into position to chuck and unchuck the work and immediately after the indexing, the clutch is automatically operated to stop the rotation of the chuck spindle and brake the spindle to hold the spindle in a fixed position. When the brake engages automatically, the sliding shaft 30 operated by the motor is shifted forward towards the end of the work spindle and into engagement with the rotatable nut and by using a draw rod having a threaded portion and shifted by a rotatable nut of the simple character described, the chuck will securely hold the work when the electric motor is disengaged, that is, when the shaft 30 is disengaged from the nut, which was not the case when air or hydraulic means was used for chucking because, in the latter constructions, the chuck only held the piece securely as long as there was pressure brought to the operating cylinders controlling the draw rod and clamping device of the chucks. In other words, if there was any leakage, the parts failed to operate properly.

From the foregoing, it will be seen that, in the present improvement, the chucking means is entirely electrically controlled by a pair of motors, one of which operates in time with the cycle of the machine to slide a shaft held in perfect alignment with the end of each work spindle as it is indexed into position while the other motor, through a suitable worm gear mechanism, rotates the sliding shaft thereby to control the opening and closing of the chuck.

On practically all automatic machines, the threading operations are performed in the upper positions so that the work has to be turned or bored first before the threading can be done and this is why, in a six spindle machine, it is arranged to chuck either in the 3rd, 4th or 5th positions.

Thus, in this improved electrical chucking machine, as soon as the spindle carrier indexes and is locked, the motor A disengages the driving clutch from the rotating work spindle which is locked in a fixed position and the clutch shifter 52 is shifted by the motor A to slide the shaft 30 so that its lugs 40 will engage similarly formed lugs of the rotating nut 19 of the draw bar unit whereupon the operator manipulates the wobble stick of the switch C, throwing the motor B into operation to rotate the shaft 30 and, thereby, operate the chuck unit.

During the working operation of the tools upon the work to complete the boring or turning of the work, there is sufficient time to chuck and unchuck the work without any loss of time and just before the spindle carrier starts to index, the motor A slides the shaft 30 and disengages it from the chucking unit within the spindle and also engages the driving clutch of the spindle and so starts the rotation of the spindle whereby the piece chucked is indexed to a suitable position to be operated upon by the tools.

From the foregoing, it will also be seen that in the present improvement only a single motor is used for rotating the axially aligned shaft and a single motor for shifting that shaft and at the same time controlling the rotation of the work spindle.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In a chucking machine having an indexible rotary spindle carrier provided with rotary chuck carrying spindles, a unit within each spindle for operating its chuck, shiftable means for engaging each chuck unit as it is indexed into position, an electrical motor rotating said shiftable means, an electric motor for axially shifting it, and means whereby the operation of said motors in sequence is electrically controlled.

2. In a chucking machine having an indexible rotary spindle carrier provided with rotary chuck carrying spindles, a unit within each spindle for operating its chuck, shiftable means for engaging each chuck unit as it is indexed into position, an electrical motor rotating said shiftable means, an electric motor for axially shifting it, means whereby the operation of said motors in sequence is electrically controlled, and means for controlling the operation of said motors.

3. In a chucking machine having an indexible rotary spindle carrier provided with rotary chuck carrying spindles, a unit within each spindle for operating its chuck, shiftable means for engaging each chuck unit as it is indexed into position, an electrical motor rotating said shiftable means, an electric motor for axially shifting it, means whereby the operation of said motors in sequence is electrically controlled, and means for controlling the operation of said motors in sequence.

4. In a chucking machine having an indexible rotary spindle carrier provided with rotary chuck carrying spindles, a unit within each spindle for operating its chuck, an aligned shiftable shaft for engaging each chuck unit as it is indexed into position, an electrical motor rotating said shiftable means, an electric motor for axially shifting it, and means whereby the operation of said motors in sequence is electrically controlled.

5. In a chucking machine having an indexible rotary spindle carrier provided with rotary chuck carrying spindles, a unit within each spindle for operating its chuck, shiftable means for engaging each chuck unit as it is indexed into position, an electrical motor rotating said shiftable means, an electric motor for axially shifting it and for controlling the rotation of the chuck spindle, and means whereby the operation of said motors in sequence is electrically controlled.

6. In a chucking machine having an indexible rotary spindle carrier provided with rotary chuck carrying spindles, a unit within each spindle for operating its chuck, an aligned shiftable shaft for engaging each chuck unit as it is indexed into position, an electrical motor rotating said shiftable means, and an electric motor for axially shifting it and for controlling the rotation of the chuck spindle, and means whereby the operation of said motors in sequence is electrically controlled.

7. In a chucking machine having an indexible rotary spindle carrier provided with rotary chuck carrying spindles, a unit within each spindle for operating its chuck, shiftable means for engaging each chuck unit as it is indexed into position, an electrical motor rotating said shiftable means, and an electric motor for axially shifting it and including gear and rack mechanism and a pair of shiftable bars controlled by the rack mechanism, one controlling the rotation of the chuck spindle and the other the shifting of the shiftable means.

8. In a chucking machine having an indexible rotary spindle carrier provided with rotary chuck carrying spindles, a unit within each spindle for operating its chuck, an axially aligned shaft for engaging each chuck unit as it is indexed into position, an electric motor for rotating said shaft, and an electric motor mechanism for axially shifting said shaft and comprising a pair of shiftable bars and cam operated means for shifting said bars, one bar controlling the rotation of the chuck spindle and the other the shifting of the shiftable shaft.

9. In a chucking machine having an indexible rotary spindle carrier provided with rotary chuck carrying spindles, a unit within each spindle for operating its chuck, an axially aligned shaft for engaging each chuck unit as it is indexed into position, an electric motor for rotating said shaft, and an electric motor mechanism for axially shifting said shaft and comprising worm gear mechanism and a pair of shiftable bars controlled by the worm gear mechanism, one controlling the rotation of the chuck spindle and the other the shifting of the shiftable shaft.

10. In a chucking machine having an indexible rotary spindle carrier provided with rotary chuck carring spindles, a unit within each spindle for operating its chuck, an axially aligned shaft for engaging each chuck unit as it is indexed into position, an electric motor for rotating said shaft, and an electric motor mechanism for axially shifting said shaft and including cam, gear and rack mechanism and a pair of shiftable bars controlled by the cam mechanism, one controlling the rotation of the chuck spindle and the other the shifting of the shiftable shaft.

11. In a chucking machine having an indexible rotary spindle carrier provided with rotary chuck carrying spindles, a unit within each spindle for operating its chuck, an axially aligned shaft for engaging each chuck unit as it is indexed into position, an electric motor for rotating said shaft, and an electric motor mechanism for axially shifting said shaft and comprising cam and worm gear mechanism, and a pair of shiftable bars controlled by the cam mechanism, one controlling the rotation of the chuck spindle and the other the shifting of the shiftable shaft.

12. In a chucking machine having an indexible rotary spindle carrier provided with rotary chuck carrying spindles, a unit within each spindle for operating its chuck, an axially aligned shaft for engaging each chuck unit as it is indexed into position, an electric motor for rotating said shaft, an electric motor mechanism for axially shifting said shaft and comprising a pair of shiftable bars and cam operated means for shifting said bars, one bar controlling the rotation of the chuck spindle and the other the shifting of the shiftable shaft, and brake mechanism for stopping the rotation of the chuck spindle.

13. In a chucking machine having an indexible rotary spindle carrier provided with rotary chuck carrying spindles, a unit within each spindle for operating its chuck, an axially aligned shaft for engaging each chuck unit as it is indexed into position, an electric motor for rotating said shaft, and an electric motor mechanism for axially shifting said shaft and including sliding means and a pair of shiftable bars controlled thereby, one controlling the rotation of the chuck spindle and the other the shifting of the shiftable shaft.

14. In a chucking machine having an indexible rotary spindle carrier provided with rotary chuck carrying spindles, a unit within each spindle for operating its chuck, an axially aligned shaft for engaging each chuck unit as it is indexed into position, an electric motor for rotating said shaft, and an electric motor mechanism for axially shifting said shaft and including rotary means and a pair of shiftable bars controlled thereby, one controlling the rotation of the chuck spindle and the other the shifting of the shiftable shaft.

15. In a chucking machine having an indexible rotary spindle carrier provided with rotary chuck carrying spindles, a unit within each spindle for operating its chuck, an axially aligned shaft for engaging each chuck unit as it is indexed into position, an electric motor for rotating said shaft, and an electric motor mechanism for axially shifting said shaft and comprising a sliding cam and a pair of shiftable bars controlled thereby, one controlling the rotation of the chuck spindle and the other the shifting of the shiftable shaft.

16. In a chucking machine having an indexible rotary spindle carrier provided with rotary chuck carrying spindles, a unit within each spindle for operating its chuck, an axially aligned shaft for engaging each chuck unit as it is indexed into position, an electric motor for rotating said shaft, and an electric motor mechanism for axially shifting said shaft and including a rotary cam and a pair of shiftable bars controlled thereby, one controlling the rotation of the chuck spindle and the other the shifting of the shiftable shaft.

17. In a chucking machine having an indexible rotary spindle carrier provided with rotary chuck carrying spindles, a unit within each spindle for operating its chuck, an axially aligned shaft for engaging each chuck unit as it is indexed into position, an electric motor for rotating said shaft, and an electric motor mechanism for axially shifting said shaft and comprising a pair of shiftable bars and cam operated means for shifting said bars, one bar controlling the rotation of the chuck spindle and the other the shifting of the shiftable shaft, and switch means co-operating with said cam means for cutting out the motor at a predetermined time.

18. In a chucking machine having an indexible rotary spindle carrier provided with rotary chuck carrying spindles, a unit within each spindle for operating its chuck, an axially aligned shaft for engaging each chuck unit as it is indexed into position, means for rotating the shaft, an electric motor controlled means for shifting it, electrical means for automatically controlling the motor, and electrical means for manually controlling it.

19. In a chucking machine having an indexible rotary spindle carrier provided with rotary chuck carrying spindles, a unit within each spindle for operating its chuck, an axially aligned shaft for engaging each chuck unit as it is indexed into position, means for rotating the shaft, an electric motor controlled means for shifting it and including a sliding rod, electrical means for automatically controlling the motor, and electrical means for manually controlling it.

20. In a chucking machine having an indexible rotary spindle carrier provided with rotary chuck carrying spindles, a unit within each spindle for operating its chuck, an axially aligned shaft for engaging each chuck unit as it is indexed into position, means for rotating the shaft, an electric motor controlled means for shifting it and including a sliding rod and cam means for shifting said rod, electrical means for automatically controlling the motor, and electrical means for manually controlling it.

21. A chuck actuating means comprising a rotatable and axially shiftable shaft, electrically operated means for rotating it, electrically operated means for shifting it, electrical means for controlling the operation of said rotating means, and electrical means for controlling both automatically and manually the electrical shifting means.

22. A chuck actuating means comprising a rotatable and axially shiftable shaft, means for rotating it, electrically operated means for shifting it, and electrical means for controlling both automatically and manually said shifting means.

23. In a chucking machine having an indexible rotary spindle carrier provided with rotary chuck carrying spindles, a unit within each spindle for operating its chuck, an axially aligned shaft for engaging each chuck unit as it is indexed into position, electrically operated means for rotating said shaft, electrically operated means for axially shifting it, electrical means including a rotary switch for automatically controlling the electrically operated axially shiftable means, and means for manually controlling said axially shiftable means.

24. In a chucking machine having an indexible rotary spindle carrier provided with rotary chuck carrying spindles, a unit within each spindle for operating its chuck, an axially aligned shaft for engaging each chuck unit as it is indexed into position, electrically operated means for rotating said shaft, electrically operated means for axially shifting it, and switch means for starting the electrically operated means and an automatically operated switch for insuring the starting of the second electrically operated means.

25. In a chucking machine having an indexible rotary spindle carrier provided with rotary chuck carrying spindles, a unit within each spindle for operating its chuck, an axially aligned shaft for engaging each chuck unit as it is indexed into position, electrically operated means for rotating said shaft, electrically operated means for axially shifting it, and automatically operative means for controlling the second electrically operated means.

26. In a chucking machine having an indexible rotary spindle carrier provided with rotary chuck carrying spindles, a unit within each spindle for operating its chuck, an axially aligned shaft for engaging each chuck unit as it is indexed into position, electrically operated means for rotating said shaft, electrically operated means for axially shifting it, means for starting the second electrically operated means, and automatically operative means for also starting the second electrically operated means in the event of the failure of the said first starting means.

27. In a chucking machine having an indexible rotary spindle carrier provided with rotary chuck carrying spindles, a unit within each spindle for operating its chuck, an axially aligned shaft for engaging each chuck unit as it is indexed into position, electrically operated means for rotating said shaft, electrically operated means for axially shifting it, and automatically operative means for cutting out the second electrically operated means at predetermined times.

28. A chuck actuating means comprising a rotatable and axially shiftable shaft, electrically operated means for rotating it, electrically operated means for shifting it, means for electrically controlling said electrically operated means, and means for automatically controlling certain operations of said second electrically operated means.

29. A chuck actuating means for use in a machine having a cam shaft and comprising a rotatable and axially shiftable shaft, electrically operated means for rotating said shaft, electrically operated means for axially shifting said shaft, means for electrically controlling said electrically operated means, and means operated from the cam shaft for automatically controlling certain operations of said second electrically operated means.

30. In a chucking machine having a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting said shiftable means, electrically operated means for rotating said shiftable means, and electrical means for controlling the operation of said electrically operated means.

31. In a chucking machine having a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting said shiftable means, electrically operated means for rotating said shiftable means, and electrical means for controlling the operation of said electrically operated means in succession.

32. In a chucking machine, a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting the shiftable means in timed relation with the cycle of the machine, electrically operated means for rotating said shiftable means, and means whereby the operation of said two electrically operated means in sequence is electrically controlled.

33. In a chucking machine, a pair of carriers, one a work carrier and the other a tool carrier, reciprocal relative to each other and indexible relative to each other and one provided with rotary chuck carrying spindles, spindle driving and stopping mechanism, a unit within each spindle for operating its chuck, shiftable means for engaging each chuck unit as it is indexed into position, electrically operated means for axially shifting the shiftable means in timed relation with the spindle driving and stopping mechanism, and electrically operated means for rotating said shiftable means.

34. In a chucking machine, a pair of carriers, one a work carrier and the other a tool carrier, reciprocal relative to each other and indexible relative to each other and one provided with rotary chuck carrying spindles, spindle driving and stopping mechanism, a unit within each spindle for operating its chuck, shiftable means for engaging each chuck unit as it is indexed into position, electrically operated means for axially shifting the shiftable means in timed relation with the spindle driving and stopping mechanism, electrically operated means for rotating said shiftable means, and means for controlling the rotation of said shiftable means subsequent to the axial shifting thereof.

35. In a chucking machine, a pair of carriers, one a work carrier and the other a tool carrier, reciprocal relative to each other and indexible relative to each other and one provided with rotary chuck carrying spindles, spindle driving and stopping mechanism, a unit within each spindle for operating its chuck, shiftable means for engaging each chuck unit as it is indexed into position, electrically operated means for axially shifting the shiftable means in timed relation with the spindle driving and stopping mechanism, electrically operated means for rotating said shiftable means, means for controlling the rotation of said shiftable means subsequent to the axial shifting thereof, and means for varying the pressure of the electrically operated rotating means upon the work.

36. In a chucking machine having a rotary shaft, a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting the shiftable means and including means controlled by the rotary shaft whereby said electrically operated means is in timed relation with the cycle of the machine, and electrically operated means for rotating said shiftable means.

37. In a chucking machine having a rotary shaft, a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting the shiftable means and including means controlled by the rotary shaft whereby said electrically operated means is in timed relation with the cycle of the machine, electrically operated means for rotating said shiftable means, and means for varying the pressure of the electrically operated rotating means upon the work.

38. In a chucking machine having a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting said shiftable means, electrically operated means for rotating said shiftable means, electrical means for controlling the operation of said electrically operated means, and means for varying the pressure of the electrically operated rotating means upon the work.

39. In a chucking machine having a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting said shiftable means, electrically operated means for rotating said shiftable means, electrical means for controlling the operation of said electrically operated means, and manually settable means for varying the pressure of the electrically operated rotating means upon the work.

40. In a chucking machine having a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting said shiftable means, electrically operated means for rotating said shiftable means, electrical means for controlling the operation of said electrically operated means, and means for varying the voltage of the electrically operated rotating means, thereby to control the pressure of the chucks upon the work.

41. In a chucking machine having a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting said shiftable means, electrically operated means for rotating said shiftable means, electrical means for controlling the operation of said electrically operated means, and manually settable means for controlling the voltage of the electrically operated rotating means thereby to vary the pressure of the chucks upon the work.

42. In a chucking machine having a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting said shiftable means, electrically operated means for rotating said shiftable means, electrical means for controlling the operation of said electrically operated means, and manually settable means for controlling the voltage of the electrically operated rotating means thereby to vary the pressure of the chucks upon the work and comprising a pair of switches, each controlling a plurality of voltages.

43. In a chucking machine having a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting said shiftable means, electrically operated means for rotating said shiftable means, electrical means for controlling the operation of said electrically operated means, and manually settable means for controlling the voltage of the electrically operated rotating means thereby to vary the pressure of the chucks upon the work and comprising a pair of means, one controlling the voltages intermediate the voltages of the other.

44. In a chucking machine having an indexible rotary spindle carrier provided with rotary chuck carrying spindles, a unit within each spindle for operating its chuck, an axially aligned shaft for engaging each chuck unit as it is indexed into position, electrically operated means for axially shifting said shaft in timed relation with the cycle of the machine, electrically operated means for rotating said shiftable shaft, manually operated means for controlling the rotation of said shiftable shaft subsequent to the axial shifting thereof, and means for varying the pressure of said electrically operated rotating means upon the work.

45. In a chucking machine having an indexible rotary spindle carrier provided with rotary chuck carrying spindles, a unit within each spindle for operating its chuck, an axially aligned shaft for engaging each chuck unit as it is indexed into position, electrically operated means for axially shifting said shaft in timed relation with the cycle of the machine, electrically operated means for rotating said shiftable shaft, manually operated means for controlling the rotation of said shiftable shaft subsequent to the axial shifting thereof, and means for varying the pressure of said electrically operated rotating means upon the work, said axial shifting means comprising gear and rack mechanism and a pair of shiftable bars controlled by the rack mechanism, one controlling the rotation of the chuck spindle and the other the shifting of the axially shiftable shaft.

46. In a chucking machine having a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting said shiftable means, and comprising a shiftable bar and rack mechanism for shifting it, and electrically operated means for rotating said shiftable means.

47. In a chucking machine having a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting said shiftable means and comprising a shiftable means and means for shifting it, electrically operated means for rotating said first shiftable means, and means whereby the operation of said electrically operated means in sequence is electrically controlled.

48. In a chucking machine having a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting said shiftable means and including a cam and a shiftable bar controlled thereby, and electrically operated means for rotating said shiftable means.

49. In a chucking machine having a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting said shiftable means and comprising cam operated shiftable means, and electrically operated means for rotating said first shiftable means.

50. In a chucking machine having a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting said shiftable means and including a shiftable bar and cam operated means for shifting said bar for controlling the rotation of the chuck spindle, and electrically operated means for rotating said shifting means.

51. In a chucking machine having a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting said shiftable means and including cam operated shiftable means for controlling the rotation of the chuck spindle, and electrically operated means for rotating said first shiftable means.

52. A chuck actuating means comprising a rotatable and axially shiftable shaft, means for rotating it, means for axially shifting it, and electrically controlled means for varying the pressure of the rotating means upon the work.

53. A chuck actuating means comprising a rotatable and axially shiftable shaft, means for rotating it, electrically operated means for shifting it, and electrically controlled means for varying the pressure of the rotating operating means upon the work.

54. A chuck actuating means comprising a rotatable and axially shiftable shaft, electrically operated means for rotating it, means for axially shifting it, and electrically controlled means for varying the pressure of the rotating means upon the work.

55. A chuck actuating means comprising a rotatable and axially shiftable shaft, electrically operated means for rotating it, electrically operated means for shifting it, and electrically controlled means for varying the pressure of the electrically operated rotating means upon the work.

56. In a chucking machine having a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting said shiftable means, electrically operated means for rotating said shiftable means, and electrically controlled means for both automatically and manually controlling said electrically operated axially shiftable means.

57. In a chucking machine having a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting said shiftable means, electrically operated means for rotating said shiftable means, electrical means for manually controlling the operation of both electrically operated means, and electrical means for automatically controlling the operation of said electrically operated axially shiftable means.

58. In a chucking machine having a rotary shaft, a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting the shiftable means and including means controlled by the rotary shaft whereby said electrically operated means is in timed relation with the cycle of the machine, electrically operated means for rotating said shiftable means, and electrical means for also manually controlling the operation of said electrically operated axially shiftable means.

59. In a chucking machine having a rotary shaft, a pair of carriers, one a work carrier and the other a tool carrier, reciprocal relative to each other and indexible relative to each other and one provided with rotary chuck carrying spindles, a unit within each spindle for operating its chuck, shiftable means for engaging each chuck unit as it is indexed into position, electrically operated means for axially shifting the shiftable means and including means controlled by the rotary shaft whereby said electrically operated means is in timed relation with the cycle of the machine, electrically operated means for rotating said shiftable means, and electrical means for manually controlling both of said electrically operated means.

60. In a chucking machine, the combination of an indexible work spindle carrier, rotary chuck carrying spindles within the work spindle carrier, a unit within each spindle for operating its chuck, shiftable means for engaging each chuck unit as it is indexed into position, means for starting and stopping each work spindle when indexed into a predetermined position, means for braking it, electrically operated means for controlling said spindle starting and stopping means and its braking means and for axially shifting the shiftable means into engagement with the chuck unit when the spindle is stopped and for shifting it from such chucking unit prior to the starting of the work spindle, and electrically operated means for rotating said shiftable means.

61. In a chucking machine, the combination of an indexible work spindle carrier, rotary chuck carrying spindles within the work spindle carrier, a unit within each spindle for operating its chuck, shiftable means for engaging each chuck unit as it is indexed into position, means for starting and stopping each work spindle when indexed into a predetermined position, means for braking it, electrically operated means for controlling said spindle starting and stopping means and its braking means and for axially shifting the shiftable means into engagement with the chuck unit when the spindle is stopped and for shifting it from such chucking unit prior to the starting of the work spindle, electrical means for both automatically and manually controlling said electrically operated means, and electrically operated means for rotating said shiftable means.

62. In a chucking machine, the combination of an indexible work spindle carrier, rotary chuck carrying spindles within the work spindle carrier, a unit within each spindle for operating its chuck, shiftable means for engaging each chuck unit as it is indexed into position, means for starting and stopping each work spindle when indexed into a predetermined position, means for braking it, electrically operated means for controlling said spindle starting and stopping means and its braking means and for axially shifting the shiftable means into engagement with the chuck unit when the spindle is stopped and for shifting it from such chucking unit prior to the starting of the work spindle, electrical means for both automatically and manually controlling said electrically operated means, electrically operated means for rotating said shiftable means, and means for manually controlling said last electrically operated means.

CHARLIE W. SIMPSON.